US009866524B2

(12) United States Patent
Aoshima

(10) Patent No.: US 9,866,524 B2
(45) Date of Patent: Jan. 9, 2018

(54) HOME GATEWAY APPARATUS AND PACKET TRANSFER METHOD

(71) Applicant: NEC Platforms, Ltd., Kanagawa (JP)

(72) Inventor: Tsutomu Aoshima, Kanagawa (JP)

(73) Assignee: NEC Platforms, Ltd., Kanagawa (JP)

(*) Notice: Subject to any disclaimer, the term of this patent is extended or adjusted under 35 U.S.C. 154(b) by 54 days.

(21) Appl. No.: 14/779,640

(22) PCT Filed: Mar. 26, 2014

(86) PCT No.: PCT/JP2014/001731
§ 371 (c)(1),
(2) Date: Sep. 24, 2015

(87) PCT Pub. No.: WO2014/156143
PCT Pub. Date: Oct. 2, 2014

(65) Prior Publication Data
US 2016/0065536 A1  Mar. 3, 2016

(30) Foreign Application Priority Data

Mar. 29, 2013 (JP) ................. 2013-071311

(51) Int. Cl.
*H04L 12/20* (2006.01)
*H04L 29/12* (2006.01)
(Continued)

(52) U.S. Cl.
CPC ...... *H04L 61/2514* (2013.01); *H04L 12/2834* (2013.01); *H04L 12/6418* (2013.01);
(Continued)

(58) Field of Classification Search
CPC ............... H04W 72/0406; H04L 12/50
(Continued)

(56) References Cited

U.S. PATENT DOCUMENTS

2013/0201316 A1* 8/2013 Binder ................. H04L 67/12
                                                              348/77
2013/0235862 A1* 9/2013 Kahng ............... H04L 61/6072
                                                              370/338

FOREIGN PATENT DOCUMENTS

JP  2003-333103  11/2003
JP  2004-357016  12/2004
JP  2008-245197  10/2008

OTHER PUBLICATIONS

International Search Report corresponding to PCT/JP2014/001731, dated Apr. 28, 2014, 1 page.
(Continued)

*Primary Examiner* — Dang Ton
(74) *Attorney, Agent, or Firm* — Wilmer Cutler Pickering Hale and Dorr LLP

(57) ABSTRACT

In order to provide a home gateway apparatus capable of smoothly executing transfer processing while ensuring security, when transferring a packet between a node (102) and an external network (101), the home gateway apparatus (100) rewrites a first address to a second address, the first address being in EUI-64 format for use as a transmission source address by the node at the time of transmission (S206); and upon receiving a packet having the second address as a destination address from the external network, rewrites the destination address of the received packet to the first address (S207).

10 Claims, 4 Drawing Sheets

(51) Int. Cl.
    *H04L 12/64*     (2006.01)
    *H04L 12/28*     (2006.01)
    *H04L 12/66*     (2006.01)
    *H04L 12/741*     (2013.01)
    *H04L 12/935*     (2013.01)

(52) U.S. Cl.
    CPC ............ *H04L 12/66* (2013.01); *H04L 45/745* (2013.01); *H04L 49/3009* (2013.01); *H04L 61/2015* (2013.01)

(58) Field of Classification Search
    USPC ........................................................ 370/329
    See application file for complete search history.

(56) References Cited

OTHER PUBLICATIONS

Fumitaka Osawa, "Trap Latent in IPv6 and Its Solution", I/O vol. 36, No. 9, Sep. 1, 2011, pp. 72-74 (4 pages).

\* cited by examiner ed States Patent (US 9,866,524 B2)

HOME GATEWAY APPARATUS AND PACKET TRANSFER METHOD

CROSS-REFERENCE TO RELATED APPLICATIONS

This application is a national stage application of International Application No. PCT/JP2014/001731 entitled "HOME GATEWAY APPARATUS AND PACKET TRANSFER METHOD," filed on Mar. 26, 2014, which claims the benefit of the priority of Japanese Patent Application No. 2013-071311, filed on Mar. 29, 2013, the disclosures of each of which are hereby incorporated by reference in their entirety.

TECHNICAL FIELD

The present invention relates to a home gateway apparatus which connects a user apparatus and an external network.

BACKGROUND ART

An interface identifier in Ethernet (registered trademark) is generated by conversion of a MAC (Media Access Control) address of a device into EUI (Extended Unique Identifier)-64 format. Therefore, an interface identifier involves a problem that a MAC address of a device can be calculated backward from an IPv6 (internet protocol version 6) address with ease, so that the interface identifier might be used for illegal attack from the outside.

As a countermeasure to this problem, for example, Patent Literature 1 discloses an apparatus intended to ensure security by preventing use of an address in EUI-64 format in advance. Patent Literature 2 discloses an apparatus for preventing a packet that uses an address in EUI-64 format through filtering.

CITATION LIST

Patent Literatures

[Patent Literature 1] Japanese Laid-open Patent Publication No. 2004-357016
[Patent Literature 2] Japanese Laid-open Patent Publication No. 2003-333103

SUMMARY OF INVENTION

Technical Problem

However, in the methods recited in Patent Literatures 1 and 2, which prevent use of an address in EUI-64 format, transfer processing is not executed smoothly in a home gateway apparatus which connects a user terminal and an external network. As a result, unexpected congestion might occur.

An object of the present invention is to provide a home gateway apparatus and a packet transfer method which enable smooth execution of transfer processing while ensuring security of communication.

Solution to Problem

The home gateway apparatus according to the present invention is a home gateway apparatus that transfers a packet between a node and an external network, which includes a conversion unit for rewriting a first address to a second address, the first address being in EUI-64 format for use as a transmission source address by the node at the time of transmission; and a reverse conversion unit for, when receiving a packet with the second address as a destination address from the external network, rewriting the destination address of the received packet to the first address.

The packet transfer method according to the present invention is a packet transfer method of a home gateway apparatus that transfers a packet between a node and an external network, in which a conversion unit rewrites a first address to a second address, the first address being in EUI-64 format for use as a transmission source address by the node at the time of transmission; and a reverse conversion unit, when receiving a packet with the second address as a destination address from the external network, rewrites the destination address of the received packet to the first address.

Advantageous Effects of Invention

According to the present invention, a transmission source address in EUI-64 format used by a node at the time of packet transmission is rewritten when the packet is transmitted to an external network. Then, a destination address of a packet transmitted from the external network to the node is rewritten to an address in EUI-64 format of the node when the packet is transferred to the node. As a result, the present invention enables security of communication to be ensured, while enabling smooth transfer processing without preventing transmission of a transmission packet.

DESCRIPTION OF EMBODIMENTS

A home gateway apparatus according to an Exemplary Embodiment of the present invention rewrites a transmission source address in EUI-64 format to be used by a connected node at the time of packet transmission. Then, the home gateway apparatus transmits a packet having the rewritten transmission source address to an external network. The home gateway apparatus also rewrites a destination address of a packet received at the node from the external network to an address in EUI-64 format. Then, the home gateway apparatus transmits the packet having the rewritten destination address to the node.

Such packet transfer control ensures communication security. Further, the home gateway apparatus enables smooth execution of transfer processing because it does not prevent transmission of a transmission packet. Further, preparing a plurality of address candidates for rewrite enables smoother transfer processing. In the following, the Exemplary Embodiments of the present invention will be detailed.

1. Network Configuration of First Exemplary Embodiment

Figure 1:
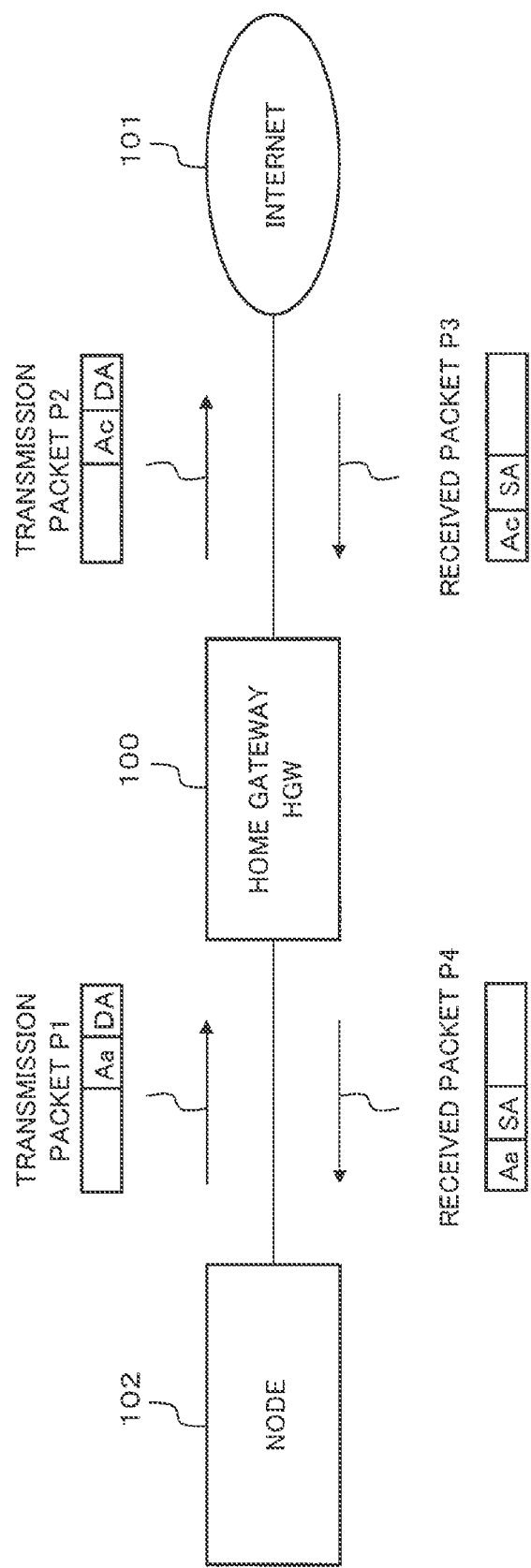
FIG. 1 A configuration diagram of a network in which a home gateway apparatus according to a First Exemplary Embodiment of the present invention is used FIG. 2 A block diagram illustrating a configuration of the home gateway apparatus of the First Exemplary Embodiment FIG. 3 A sequence diagram illustrating an example of a packet transfer procedure of a home gateway apparatus according to a Second Exemplary Embodiment of the present invention FIG. 4 A sequence diagram illustrating an example of a packet transfer procedure of a home gateway apparatus according to a Third Exemplary Embodiment of the present invention

FIG. 1 is a configuration diagram of a network in which a home gateway apparatus according to a First Exemplary Embodiment of the present invention is used. In the following description of the Exemplary Embodiments, "home gateway apparatus" will be simply recited as "home gateway". In FIG. 1, the home gateway (HGW) 100 of the First Exemplary Embodiment of the present invention enables packet transmission and reception by connecting the Internet 101 as an external network and a node 102 as a user apparatus. When receiving a packet P1 directed to the external network and transmitted from the node 102, the home gateway 100 rewrites a transmission source address Aa of the packet to a new address Ac by a method which will be described later. Then, the home gateway 100 sends out a packet P2 having a rewritten transmission source address to the Internet 101. At that time, the home gateway 100 holds a correspondence between the original address Aa of the node 102 and the new address Ac. When receiving a packet P3 directed to the node 102 from the Internet 101, the home gateway 100 rewrites a destination address Ac of the packet to the address Aa of the node 102. Then, the home gateway 100 transfers a packet P4 having an address rewritten to Aa to the node 102. In the following, a configuration and operation of the home gateway 100 will be described in detail.

2. Home Gateway of First Exemplary Embodiment

Figure 2:
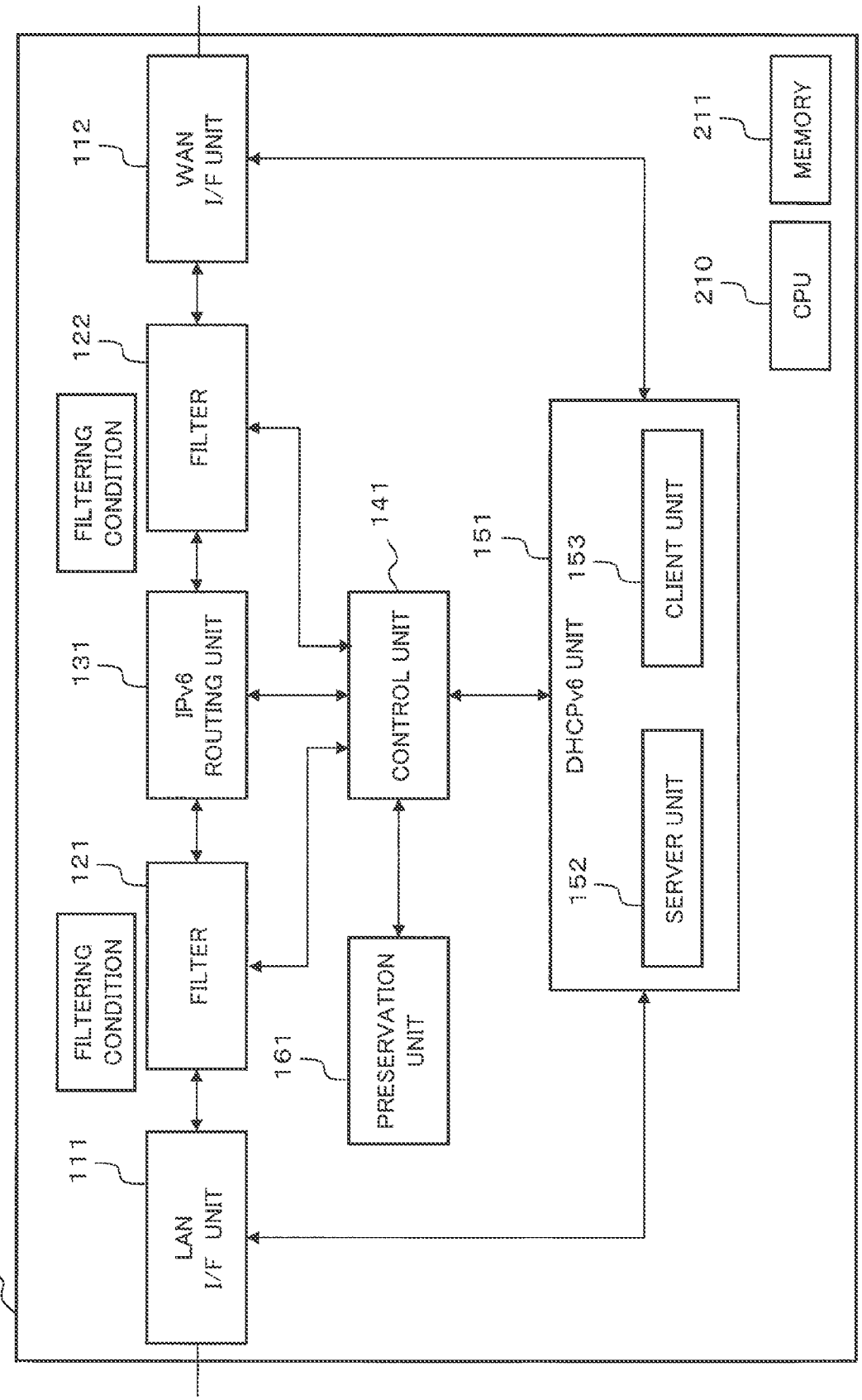

FIG. 2 is a block diagram illustrating a configuration of the home gateway of the First Exemplary Embodiment. With reference to FIG. 2, the home gateway 100 includes a LAN (local area network) interface unit 111, a WAN (wide area network) interface unit 112, a filter 121 and a filter 122. The home gateway 100 further includes an IPv6 routing unit 131, a control unit 141, a DHCPv6 (dynamic host configuration protocol version 6) unit 151, a DHCPv6 server unit 152, a DHCPv6 client unit 153 and a preservation unit 161. In the filter 121 a filtering condition 020 is set. In the filter 122 a filtering condition 021 is set. The home gateway 100 also has a function such as IPv4. However, since the function such as IPv4 is not directly related to the present Exemplary Embodiment, the description thereof is omitted.

The LAN interface unit 111 is connected to a home network and receives a packet whose Layer 2 header destination is an address of the LAN interface unit 111 or a multicast address. The LAN interface unit 111 transmits a packet routed from the IPv6 routing unit 131 to the home network.

The WAN interface unit 112 is connected to an upper router on a network of a telecommunications carrier. The WAN interface unit 112 receives a packet whose Layer 2 header destination is an address of the WAN 122 and a packet whose Layer 2 header destination is a multicast address. The WAN interface unit 112 also transmits a packet routed from the IPv6 routing unit 131 to the upper router. The WAN interface unit 112 also confirms whether an address received from the DHCPv6 unit 151 overlaps with an address in use. Then, when the addresses do not overlap with each other, the WAN interface unit 112 uses the received address to communicate. When the addresses overlap with each other, the WAN interface unit 112 notifies the DHCPv6 unit 151 that the addresses overlap with each other.

The filter 121 executes filtering with respect to a packet input from the LAN interface unit 111 according to a filtering condition set in the home gateway 100. When the input packet fails to meet the filtering condition, the filter 121 transfers the input packet to the IPv6 routing unit 131 without processing. With respect to a packet received from the WAN interface unit 112, the filter 121 executes no filtering. The filter 121 also executes filtering under a filtering condition set by the control unit 141.

The filtering condition is that a transmission source address of a packet is generated in EUI-64 format and a destination address is different from a prefix output with respect to the node connected to the LAN interface unit 111 as will be described later. When receiving a packet meeting the filtering condition, the filter 121 transmits the packet to the control unit 141.

The filter 122 executes filtering with respect to a packet input from the WAN interface unit 112 based on the filtering condition set in the home gateway 100. Then, when the input packet fails to meet a filtering condition which will be described later, the filter 122 transfers the input packet to the IPv6 routing unit 131 without processing. With respect to a packet received from the LAN interface unit 111, the filter 122 executes no filtering. The filter 122 also executes filtering under the filtering condition set by the control unit 141. The filtering condition is that a destination address of a packet received by the filter 122 from the WAN interface unit 112 is the same as the address rewritten by the control unit 141. A packet meeting this filtering condition is sent to the control unit 141.

Based on a destination IPv6 address, a port number and reception interface information of a packet received from each of the filter 121, the filter 122 and the control unit 141, the IPv6 routing unit 131 transfers the received packet to each function unit.

The control unit 141 generates an address in EUI-64 format from prefix information received from the DHCPv6 unit 151 and a MAC address of a node received from the preservation unit 161. The control unit 141 creates a filtering condition combining the address and the prefix, and notifies the filter 121 of the condition. Also when receiving a filtered packet from the filter 121, the control unit 141 notifies the DHCPv6 unit 151 of address rewrite in order to confirm whether a transmission source address prepared for address rewrite can be used. Then, the control unit 141 receives an address for rewrite from the DHCPv6 unit to rewrite a transmission source address of the filtered packet by using the address for rewrite. Further, the control unit 141 transmits the packet having the rewritten address to the IPv6 routing unit 131. At this time, the control unit 141 preserves the address before being rewritten and the rewritten address in the preservation unit 161. When receiving a filtered packet from the filter 122, the control unit 141 again rewrites a transmission source address back to an address in EUI-64 format. In other words, the control unit 141 rewrites the transmission source address of the packet filtered at the filter 122, which is stored as a rewritten address in the preservation unit 161, to an address in EUI-64 format (address before being rewritten). The packet having the rewritten packet is transmitted to the IPv6 routing unit 131.

The DHCPv6 unit 151 includes the server unit 152 and the client unit 153. The server unit 152 serves a DHCPv6 server function. When a prefix to be distributed to the node is determined, the server unit 152 also notifies the control unit 141 of the prefix information. The client unit 153 has a DHCPv6 client function. Also when receiving an address rewrite notification from the control unit 141, the client unit 153 generates an address and sets the generated address in the WAN interface unit 112. At this time, as a generated address, not an address in EUI-64 format but a random value is used. When receiving a notification of address overlap from the WAN interface unit 112, the client unit 153 deletes the overlapping address to set the newly generated address in the WAN interface unit 112.

The preservation unit 161 preserves a MAC address of the node connected to the LAN interface unit 111 as a MAC table. The preservation unit 161 notifies the control unit 141 of a MAC address. An address before being rewritten and a rewritten address received from the control unit 141 are preserved in one-to-one correspondence in the preservation unit 161. Further, as will be described later, a plurality of address candidates for rewrite may be stored in advance in the preservation unit 161.

Functions equivalent to those of the above-described filter 121, filter 122, IPv6 routing unit 131, control unit 141, DHCPv6 unit 151, DHCPv6 server unit 152 and DHCPv6 client unit 153 can be also realized by executing a program stored in a memory 211 by a CPU (central processing unit) 210. The memory 211 is, for example, a semiconductor nonvolatile memory. Further, a function of the home gateway to be recited in the following Exemplary Embodiments may also be realized by executing the program stored in the memory 211 by the CPU 210.

3. Second Exemplary Embodiment (3.1) Packet Transfer Control

To the home gateway 100, a prefix 300 is distributed from a server on the Internet. The client unit 153 of the DHCPv6 unit 151 receives the prefix 300 and transmits the received prefix 300 to the server unit 152 and the control unit 141. The server unit 152 distributes the prefix 300 received from the client unit 153 to the node connected to the home gateway 100. When the prefix 300 is distributed, since the node needs to generate an address in EUI-64 format, the distribution of the prefix 300 may be executed by a stateless address distribution procedure.

Figure 3:
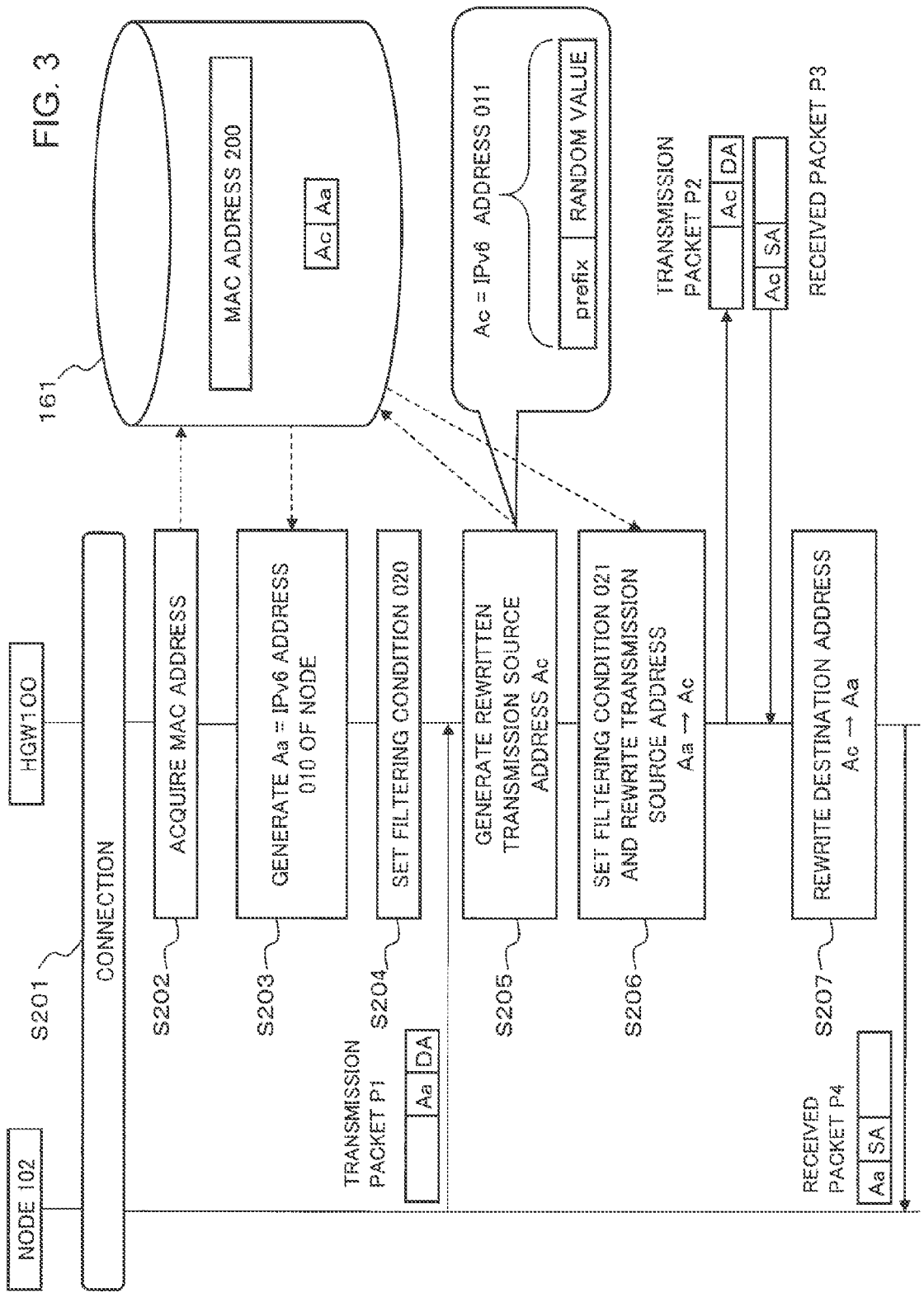

FIG. 3 is a sequence diagram illustrating an example of a packet transfer procedure of a home gateway according to a Second Exemplary Embodiment. In FIG. 3, when connected to the node 102 having a MAC address 200 (process S201), the home gateway 100 acquires the MAC address of the node 102 by using a Neighbor Discovery or an ARP (address resolution protocol) (process S202). There is no limitation to a method of acquiring a MAC address. The acquired MAC address 200 is preserved in the preservation unit 161 as a MAC table. In addition, the MAC address 200 is simultaneously transmitted from the preservation unit 161 to the control unit 141.

The control unit 141 receives the prefix 300 from the DHCPv6 unit 151. Then, at the stage of receiving the MAC address 200 from the preservation unit 161, the control unit 141 generates an IPv6 address 010 (=Aa) by using information of the prefix 300 and the MAC address 200 (process S203). The IPv6 address 010 is an address generated by the node 102 when an address is assumed to be generated in EUI-64 format. Then, the control unit 141 creates the filtering condition 020 for detecting a packet having the generated IPv6 address 010 as a transmission source address and notifies the filter 121 of the created condition. The filter 121 sets the notified filtering condition 020 (process S204).

When receiving a packet P1 directed to the Internet from the node 102, the LAN interface unit 111 transfers the packet to the filter 121. When the packet received from the LAN interface unit is a packet meeting the filtering condition 020, the filter 121 transfers the received packet to the control unit 141. A packet not meeting the filtering condition 020 is transferred from the filter 121 to the IPv6 routing unit 131. The packet transferred to the IPv6 routing unit 131 is routed and sent out from the WAN interface unit 112 or the LAN interface unit 111.

When receiving a packet meeting the filtering condition 020, the control unit 141 rewrites a transmission source address Aa of the packet in the following manner.

The address having been rewritten is generated by making a prefix part be the prefix 300 distributed from the network side and an interface ID part be a random value as illustrated in FIG. 3 (process S205). The address having been rewritten is taken as an IPv6 address 011 (=Ac). Then, the control unit 141 transfers the IPv6 address 011 to the WAN interface unit 112. The WAN interface unit 112 confirms whether the IPv6 address 011 can be used without overlapping with an existing address. When the IPv6 address 011 is usable, the WAN interface unit 112 sets the IPv6 address 011 and notifies the control unit 141 that the IPv6 address 011 is usable. When the addresses overlap with each other, the WAN interface unit 112 notifies the control unit 141 that the addresses overlap with each other. When notified that the addresses overlap, the control unit 141 generates a new IPv6 address having an interface ID part changed to another random value and notifies the WAN interface unit 112 of the new IPv6 address. Also with respect to the new IPv6 address, the WAN interface unit 112 similarly confirms overlap or non-overlap of the addresses. Hereinafter, the same procedure will be repeated until an IPv6 address is set in the WAN interface unit 112.

Upon receiving from the WAN interface unit 112 notification that the IPv6 address 011 is usable, the control unit 141 rewrites the transmission source address of the packet received from the filter 121 from the IPv6 address 010 to the IPv6 address 011. Then, the control unit 141 transmits the packet having the rewritten address to the IPv6 routing unit 131. Further, the control unit 141 creates the filtering condition 021 targeting a packet whose destination address is the IPv6 address 011 and notifies the filter 122 of the condition 021. The filter 122 sets the filtering condition 021 (process S206). The preservation unit 161 preserves the IPv6 address 010 (=Aa) which is an address before being rewritten and the IPv6 address 011 (=Ac) which is an address having been rewritten so that these addresses correspond to each other.

The packet having rewritten and having sent to the IPv6 routing unit 131 is routed and transmitted from the WAN interface unit 112 to the Internet 101 through the filter 122.

Next, it is assumed that a response packet P3 directed to the node 102 has arrived at the home gateway 100 from the Internet 101. Since a transmission source address of the response packet P3 has been rewritten by the home gateway 100 as described above, a destination address is the IPv6 address 011 (=Ac). The WAN interface unit 112 transfers the packet received from the Internet 101 to the filter 122 and the packet is filtered by the filter 122 under the filtering condition 021. Since the above-described response packet P3 meets the filtering condition 021, the filter 122 transfers the packet P3 to the control unit 141.

The control unit 141 searches, from among IPv6 addresses preserved in the preservation unit 161, for the IPv6 address 011 as a destination address of the packet P3 received from the filter 121. Since in the preservation unit 161, the IPv6 address 010 as an address before being rewritten is preserved correspondingly to the IPv6 address 011, the control unit 141 can acquire an address before being rewritten. Then, the control unit 141 rewrites the destination address of the received packet P3 to the IPv6 address 010 (=Aa) and transmits the rewritten packet to the IPv6 routing unit 131 as the packet P4 (process S207).

The IPv6 routing unit 131 executes routing of the packet P4 received from the control unit 141. This causes the packet P4 to be passed through the filter 121 and transmitted from the LAN interface unit 111 to the node 102.

(3.2) Advantageous Effect

In this manner, the home gateway 100 converts an address of a packet. As a result, the node 102 can communicate with the Internet 101 without using an address in EUI-64 format, so that communication security can be increased without particularly changing setting of the node 102.

4. Third Exemplary Embodiment

In a Third Exemplary Embodiment of the present invention, a plurality of rewritable address candidates is prepared. At the time of address rewrite, one address is selected from among the address candidates and is taken as a transmission source address of a transmission packet. Further, a filtering condition is set. In the following, description will be made with reference to FIG. 4, in which the same reference numeral will be given to the same operation as that in the above-described Second Exemplary Embodiment to omit description thereof.

(4.1) Packet Transfer Control

Figure 4:
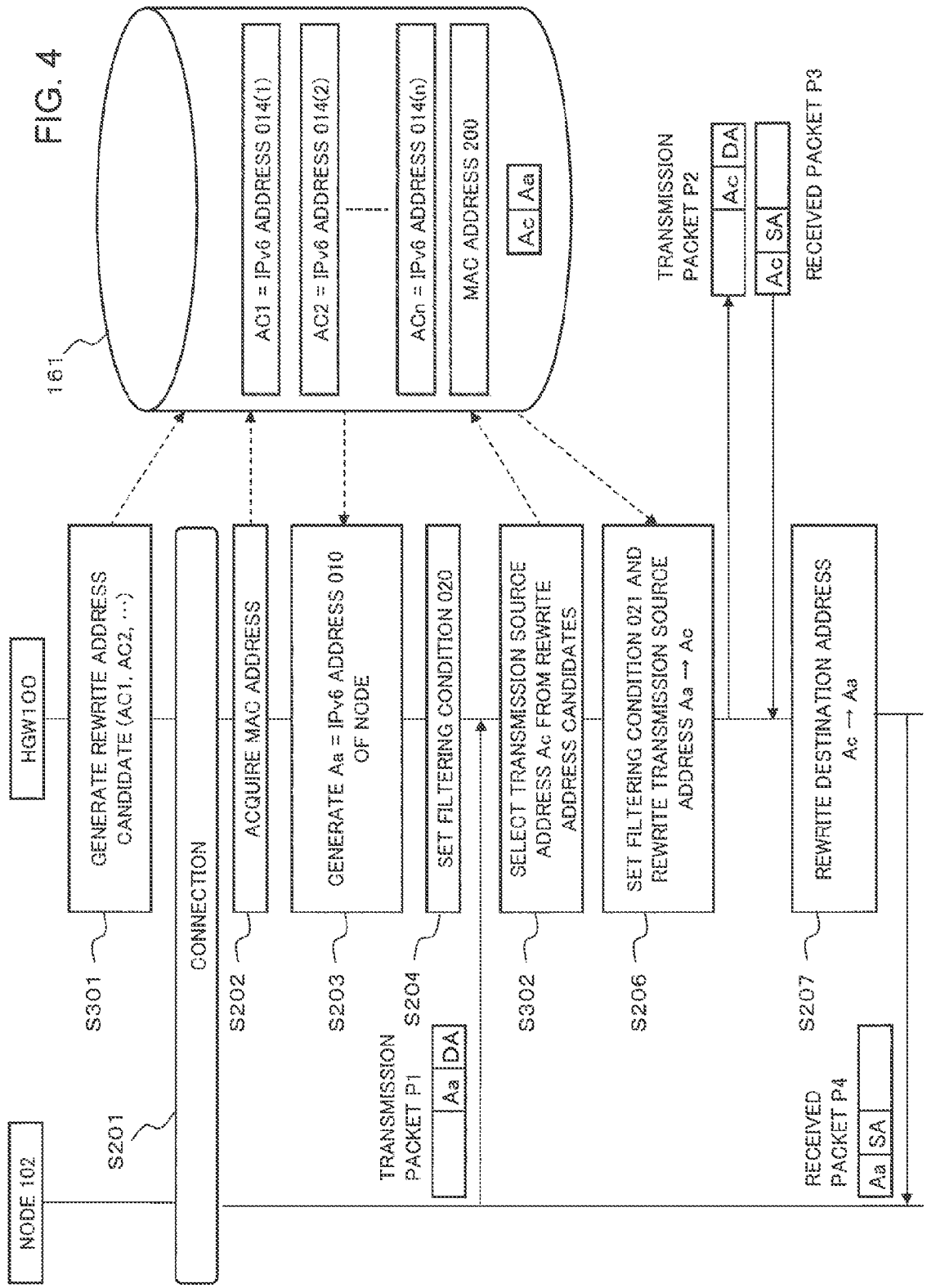

FIG. 4 is a sequence diagram illustrating an example of a packet transfer procedure of a home gateway according to the Third Exemplary Embodiment. In FIG. 4, first, when a prefix 301 is distributed to the home gateway 100 from the Internet 101, the DHCPv6 unit 151 generates a plurality of address candidates for rewrite ACs and notifies the WAN interface unit 112 of the candidates. These address candidates ACs may be generated using the prefix 301 and a random value similarly to the above Second Exemplary Embodiment. The WAN interface unit 112 confirms whether or not the notified IPv6 address candidates overlap with already used addresses. When the addresses do not overlap with each other, the WAN interface unit 112 sets the notified IPv6 addresses, as well as notifying the DHCPv6 unit 151 of the addresses. The DHCPv6 unit preserves the rewrite IPv6 address candidates AC1-ACn (IPv6 address 014(1) to 014(n)) in the preservation unit 161 (process S301).

In this state, the node 102 and the LAN interface unit 111 are connected (process S201). Then, when communication starts between the node 102 and the Internet 101, the home gateway 100 generates the IPv6 address 010, as an address in EUI-64 format, from a MAC address and a prefix of the node 102 similarly to the Second Exemplary Embodiment (process S203). Then, the home gateway 100 creates the filtering condition 020 and sets the condition in the filter 121 (process S204). When the packet P1 transmitted from the node 102 meets the set filtering condition 020, the packet P1 is transferred to the control unit 141.

The control unit 141 acquires a transmission source address Ac (=IPv6 address 014(i)) from the plurality of address candidates ACs usable for rewrite from the preservation unit 161 (process S302). Then, the control unit 141 rewrites the transmission source address and sets the filtering condition 021 (process S206). Further, the control unit 141 preserves in the preservation unit 161 the IPv6 address Aa before being rewritten and the IPv6 address Ac already used for the rewrite so that the addresses correspond to each other.

(4.2) Advantageous Effect

Thus, similarly to the Second Exemplary Embodiment, address conversion by the home gateway 100 enables the node 102 to safely communicate with the Internet network.

In particular, the present Exemplary Embodiment enables smoother address conversion by preparing a plurality of addresses for conversion at the stage where a prefix is distributed from the Internet 101.

5. Fourth Exemplary Embodiment

The present invention is also applicable when the node 102 uses not an EUI-64 format but a fixed IPv6 address. In this case, an apparatus configuration is the same as that of FIG. 2. In the preservation unit 161, however, a fixed address to be used by the node is preserved in advance.

First, in the node 102 connected to the LAN interface unit 111, an IPv6 address 012 is fixedly set. Then, in the preservation unit 161 of the home gateway 100, the IPv6 address 012 set in the node 102 is preserved. Then, the control unit 141 creates a filtering condition 022 for detecting a packet having the IPv6 address 012 as a transmission source address and sets the condition in the filter 121. The filtering condition 022 enables execution of filtering only when the IPv6 address 012 as an address conversion target is used similarly to the Second Exemplary Embodiment.

The LAN interface unit 111 transfers, to the filter 121, the packet P1 directed to the Internet which is received from the node 102. The above-described filtering condition 022 is set in the filter 121. Accordingly, when the node 102 uses the IPv6 address 012, the packet P1 is transferred to the control unit 141. When the address used in the packet P1 does not meet the filtering condition, the packet P1 is transferred to the IPv6 routing unit 131. The control unit 141 converts a transmission source address of the packet P1 and transmits the resultant packet to the Internet through the WAN interface unit 112 similarly to the Second Exemplary Embodiment. When the response packet P3 is received from the Internet, the control unit 141 rewrites a destination address of the packet P3 to the IPv6 address 012.

In the above-described Second and Third Exemplary Embodiments, the filtering condition 020 was created from the MAC address 200 of the node 102 and the prefix 300 distributed from the Internet network. In the Fourth Exemplary Embodiment, however, the filtering condition 020 is created from the IPv6 address 012 preserved in the preservation unit 161 in advance.

The exemplary embodiments of the present invention have been described with reference to the exemplary embodiments in the foregoing. A mode to which present invention is applicable is, however, not limited to the above-described exemplary embodiments. Various modifications that can be appreciated by those skilled in the art may be made in the configuration and the detailed description of the present invention within the scope of the present invention.

This application claims priority from Japanese Patent Application No. 2013-071311, filed on Mar. 29, 2013, disclosure of which is all incorporated herein.

INDUSTRIAL APPLICABILITY

The present invention is applicable to an environment in which a home gateway acquires a prefix from an upper router on an Internet network and distributes the same to a lower node.

REFERENCE SIGNS LIST 100 home gateway
101 Internet
102 node
111 LAN interface unit
112 WAN interface unit
121 filter
122 filter
131 IPv6 routing unit
141 control unit
151 DHCPv6 unit
152 server unit
153 client unit
161 preservation unit
210 CPU
211 memory

The invention claimed is:

1. A home gateway apparatus which transfers a packet between a node and an external network, comprising:
a conversion unit that rewrites a first address to a second address, the first address being in EUI-64 format for use as a transmission source address by the node at the time of transmission;
a reverse conversion unit that, upon receiving a packet having the second address as a destination address from the external network, rewrites the destination address of the received packet to the first address; and
a storage unit that stores a plurality of second address candidates in advance, wherein the conversion unit selects the second address for rewrite from the plurality of second address candidates.

2. The home gateway apparatus according to claim 1, further comprising a filtering unit that filters a packet from the external network according to the second address selected from the second address candidates.

3. A home gateway apparatus which transfers a packet between a node and an external network, comprising:
a conversion unit that rewrites a first address to a second address, the first address being in EUI-64 format for use as a transmission source address by the node at the time of transmission; and
a reverse conversion unit that, upon receiving a packet having the second address as a destination address from the external network, rewrites the destination address of the received packet to the first address,
wherein the second address is generated from a prefix distributed from the external network and a random value.

4. A packet transfer method of a home gateway apparatus which transfers a packet between a node and an external network, comprising:
rewriting a first address to a second address, the first address being in EUI-64 format for use as a transmission source address by the node at the time of transmission;
upon receiving a packet having the second address as a destination address from the external network, rewriting the destination address of the received packet to the first address;
storing a plurality of second address candidates in advance; and
selecting the second address for rewrite from the plurality of second address candidates.

5. The packet transfer method according to claim 4, further comprising filtering a packet from the external network according to the second address selected from the second address candidates.

6. A packet transfer method of a home gateway apparatus which transfers a packet between a node and an external network, comprising:
rewriting a first address to a second address, the first address being in EUI-64 format for use as a transmission source address by the node at the time of transmission;
upon receiving a packet having the second address as a destination address from the external network, rewriting the destination address of the received packet to the first address; and
further comprising generating the second address from a prefix distributed from the external network and a random value.

7. The home gateway apparatus according to claim 1, wherein the second address is generated from a prefix distributed from the external network and a random value.

8. The home gateway apparatus according to claim 2, wherein the second address is generated from a prefix distributed from the external network and a random value.

9. The packet transfer method according to claim 4, further comprising generating the second address from a prefix distributed from the external network and a random value.

10. The packet transfer method according to claim 5, further comprising generating the second address from a prefix distributed from the external network and a random value.

* * * * *